United States Patent [19]

Irie

[11] Patent Number: 5,690,970
[45] Date of Patent: Nov. 25, 1997

[54] SPLIT MOLD OPENING/CLOSING DEVICE FOR A TIRE VULCANIZER

[75] Inventor: Nobuhiko Irie, Nagasaki, Japan

[73] Assignee: Mitsubishi Jukogyo Kabushiki Kaisha, Tokyo, Japan

[21] Appl. No.: 642,891

[22] Filed: May 6, 1996

[30] Foreign Application Priority Data

May 31, 1995 [JP] Japan ............... 7-133844

[51] Int. Cl.⁶ .............. B29C 33/24; B29D 30/06
[52] U.S. Cl. .............................. 425/46; 425/47
[58] Field of Search ................. 425/46, 47, 195

[56] References Cited

U.S. PATENT DOCUMENTS

| | | | |
|---|---|---|---|
| 4,076,473 | 2/1978 | Macmillan | 425/47 |
| 5,259,742 | 11/1993 | Ichikawa et al. | 425/47 |
| 5,589,200 | 12/1996 | Irie | 425/46 |

FOREIGN PATENT DOCUMENTS

| | | |
|---|---|---|
| 0270021 | 6/1988 | European Pat. Off. . |
| 0685320 | 12/1995 | European Pat. Off. . |
| 4434406 | 3/1995 | Germany . |
| 62-48512 | 3/1987 | Japan . |

*Primary Examiner*—James P. Mackey
*Attorney, Agent, or Firm*—Birch, Stewart, Kolasch & Birch, LLP

[57] ABSTRACT

In the present invention, when a tire is vulcanized, a flange fixed to either one of a top plate of a split mold and a piston rod tip end of a split mold opening/closing cylinder is held by operating fingers. The fingers are assembled in such a manner to be capable of oscillating in the holding direction by the return force of a spring. The top plate is connected to a piston rod of the split mold opening/closing cylinder. Thereupon, the split mold is opened and closed by the output of the split mold opening/closing cylinder and the vertical movement of a bolster plate. When the split mold is replaced, holding is released by oscillating the fingers by using a finger driving device, by which the top plate is separated from the piston rod of the split mold opening/closing cylinder.

4 Claims, 5 Drawing Sheets

SPLIT MOLD OPENING/CLOSING DEVICE FOR A TIRE VULCANIZER

FIELD OF THE INVENTION AND RELATED ART STATEMENT

The present invention relates to a split mold opening/closing device used by being incorporated in a tire vulcanizer.

Conventionally, tire vulcanizing molds used by being incorporated in a tire vulcanizer come in two types: a two-piece mold divided into upper and lower two pieces and a split mold in which the tread mold portion is divided into multiple pieces in the circumferential direction. To open and close this split mold, a tire vulcanizer incorporates a split mold opening/closing device.

A split mold and a conventional split mold opening/closing device will be described with reference to FIG. 4. Reference numeral 1 denotes a base frame for a tire vulcanizer, 3 denotes a lower hot plate bolted to the base frame 1 via a heat insulating plate 2, and 4 denotes a central mechanism for operating a bladder, incorporated inside the lower hot plate 3. To the central mechanism 4 for operating a bladder are assembled upper and lower bead rings 8 and 9.

Reference numeral 7 denotes a bolster plate assembled to a body frame (not shown) of the tire vulcanizer via a guide member (not shown) in such a manner as to be movable vertically. The bolster plate 7 is moved vertically by the operation of an elevation driving means (not shown). Reference numeral 5 denotes an upper hot plate bolted to the bolster plate 7 via a heat insulating plate 6.

A split mold 10 comprises a bottom plate 11 bolted to the lower hot plate 3, a lower wall mold portion 15 bolted to the bottom plate 11, a tread mold portion 16 which is divided into multiple pieces in the circumferential direction and fixed to the inner peripheral surface of segments 12, described later, a top plate 14, an upper wall mold portion 17 bolted to the top plate 14, a plurality of segments 12 which are assembled to the top plate 14 via a guide member (not shown) in such a manner as to be slidable in the radial direction and arranged by slidably touching the bottom plate 11, and an outer ring 13 which has an inside inclined face engaging with the outside inclined face of the segment 12, can be moved vertically in a sliding manner with respect to the segment 12, and is bolted to the upper hot plate 5.

A split mold opening/closing device 100 is composed of a split mold opening/closing cylinder 103 fixed to the bolster plate 7 via a bracket 101 and a flange 102, and a flange 104 fixed to the tip end of a piston rod of the cylinder 103.

This flange 104 is bolted to the top plate 14 of the aforementioned split mold 10, so that the tread mold portion 16 is opened and closed by the operation of the cylinder 103.

More specifically, when a pressure fluid is supplied to the split mold opening/closing cylinder 103, the piston rod is operated in the extending direction to raise the bolster plate 7, by which the outer ring 13 is pulled up by the bolster plate 7 with the segments 12 being pressed against the bottom plate 11 via the top plate 14. Consequently, the top plate 14 and the upper hot plate 5 are separated from each other, so that the segments 12 are moved outward in the radial direction by the guide effect between the segments 12 and the outer ring 13, by which the tread mold portion 16 is opened.

When the bolster plate 7 is further raised and the split mold opening/closing cylinder 103 reaches the stroke end, the upper wall mold portion 17 and the segments 12 are hung by the flange 104 via the top plate 14, and raised with the bottom plate 11 and the lower wall mold portion 15 being left, by which the split mold 10 is opened.

In order to close the split mold 10, the bolster plate 7 is lowered with the piston rod of the split mold opening/closing cylinder 103 being kept extended, the lower faces of the expanded segments 12 abut on the bottom plate 11, and the piston rod is pushed back. Thereupon, the split mold 10 is closed by the movement reverse to the above-described movement.

When the segments 12 are housed in the outer ring 13 for the purpose of heat insulation etc. of the tread mold portion 16 of the opened split mold 10, the piston rod of the cylinder 103 is operated in the retracting direction to pull up the tread mold portion 16 and the like, by which the segments 12 are housed in the outer ring 13.

However, on the conventional tire vulcanizer shown in FIG. 4, the split mold is sometimes removed or renewed for a replacement (change of production size or type) of the split mold 10. In this case, the attachment and detachment work, by means of bolts, of the flange 104 installed at the tip end of the piston rod of the split mold opening/closing cylinder 103 is carried out over the head of the worker in the tire vulcanizer.. Therefore, the workability is very poor. Also, the work requires a long period of time, resulting in the decrease in the operation rate of the tire vulcanizer.

To solve this problem, the applicant of the present invention already proposed a split mold opening/closing device for a tire vulcanizer as shown in FIG. 5 (Japanese Patent Publication No. 05-62046 (No. 62046/1993)).

In this split mold opening/closing device, when the mold is replaced, bayonet lock claws 214a and 215a are disengaged by turning a lever 223, and the turning of the lever 223 is prevented by inserting a pin 227 in one hole 228. Also, the outer ring 13 is disengaged from the upper hot plate 5, and the lower side wall mold 15 is disengaged from the lower hot plate 11, and then the bolster plate 7 is raised to open the vulcanizer.

At this time, all portions above the upper hot plate 5 are raised together with the vulcanizer, and the split mold 10 is left on the lower hot plate 11. Here, the whole of the split mold 10 is removed from the vulcanizer, and a new split mold 10 is inserted. A bayonet lock 215 is also installed to the new split mold 10.

Then, the vulcanizer is closed. Opposite to the aforementioned work, the outer ring 13 and the lower side wall mold 15 are attached to the vulcanizer, the pin 227 is lifted, the bayonet lock claws 214a and 215a are engaged by turning the lever 223, and the pin 227 is inserted in another hole 228 at that position to fix the lever 223. In this condition, the vulcanizer is ready to start vulcanizing operation.

When the mold is opened after vulcanization, the piston rod 103a of the split mold opening/closing cylinder 103 is operated in the extending direction, the upper face of the bayonet lock 215 is pushed from the lower face of a holder 213, and a tread mold 12 is opened radially outward in the radial direction via the upper bead ring 9 and the side wall mold 17.

When the split mold is closed, the bolster plate 7 is lowered with the piston rod of the split mold opening/closing cylinder 103 being kept extended, by which the lower face of the expanded tread mold 12 abuts on the bottom plate 11, and the piston rod 103a is pushed back. Thereupon, the split mold 10 is closed by the movement reverse to the above-described movement.

When the tread mold 12 is housed in the outer ring 13 for the purpose of heat insulation etc. of the tread mold 12 of the opened split mold 10, the piston rod 103a of the split mold opening/closing cylinder 103 is operated in the retracting direction, the bayonet lock 215 is lifted by the engagement of the bayonet lock claws 214a and 215a, and the tread mold 12 is housed in the outer ring 13 via the side wall mold 17.

The conventional split mold opening/closing device for a tire vulcanizer shown in FIG. 5 has problems in that (a) the fabrication cost is high because a bayonet lock is used as a connection claw, and (b) for a hydraulic cylinder, the piston rod sometimes rotates in the extending and retracting operation of the piston rod because of the honing in manufacture, so that the phase shift of claw due to the rotation must be prevented; therefore, the construction is complicated and the manufacture cost is high.

OBJECT AND SUMMARY OF THE INVENTION

The present invention was made to solve the above problems. Accordingly, an object of the present invention is to provide a split mold opening/closing device for a tire vulcanizer, in which (1) there is no hindrance in holding a flange by using fingers, and (2) the manufacture cost can be reduced.

To achieve the above object, according to the present invention, a split mold opening/closing device used by being incorporated in a tire vulcanizer comprises a flange fixed to either one of a top plate of a split mold and a piston rod tip end of a split mold opening/closing cylinder, a plurality of fingers assembled in such a manner to be capable of oscillating, and a finger driving device for holding and releasing the flange by oscillating the fingers.

When a tire is vulcanized, the flange fixed to either one of the top plate of the split mold and the piston rod tip end of the split mold opening/closing cylinder is held by operating the fingers, which are assembled in such a manner to be capable of oscillating, in the holding direction by the return force of a spring, by which the top plate is connected to a piston rod of the split mold opening/closing cylinder. Thereupon, the split mold is opened and closed by the output of the split mold opening/closing cylinder and the vertical movement of a bolster plate. When the split mold is replaced, holding is released by oscillating the fingers by-using the finger driving device, by which the top plate is separated from the piston rod of the split mold opening/closing cylinder.

In the split mold opening/closing device for a tire vulcanizer in accordance with the present invention, the connection between the split mold and the split mold opening/closing cylinder can be made automatically in a short period of time as described above, and the connecting part is designed so that the flange is held and released by the fingers. Therefore, even if the piston rod of the split mold opening/closing cylinder rotates, there is no hindrance in holding the flange by using the fingers. Also, since the construction is simple and a bayonet lock whose fabrication cost is high is not used, the manufacture cost of the split mold opening/closing device for a tire vulcanizer can be reduced.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

Figure 1:
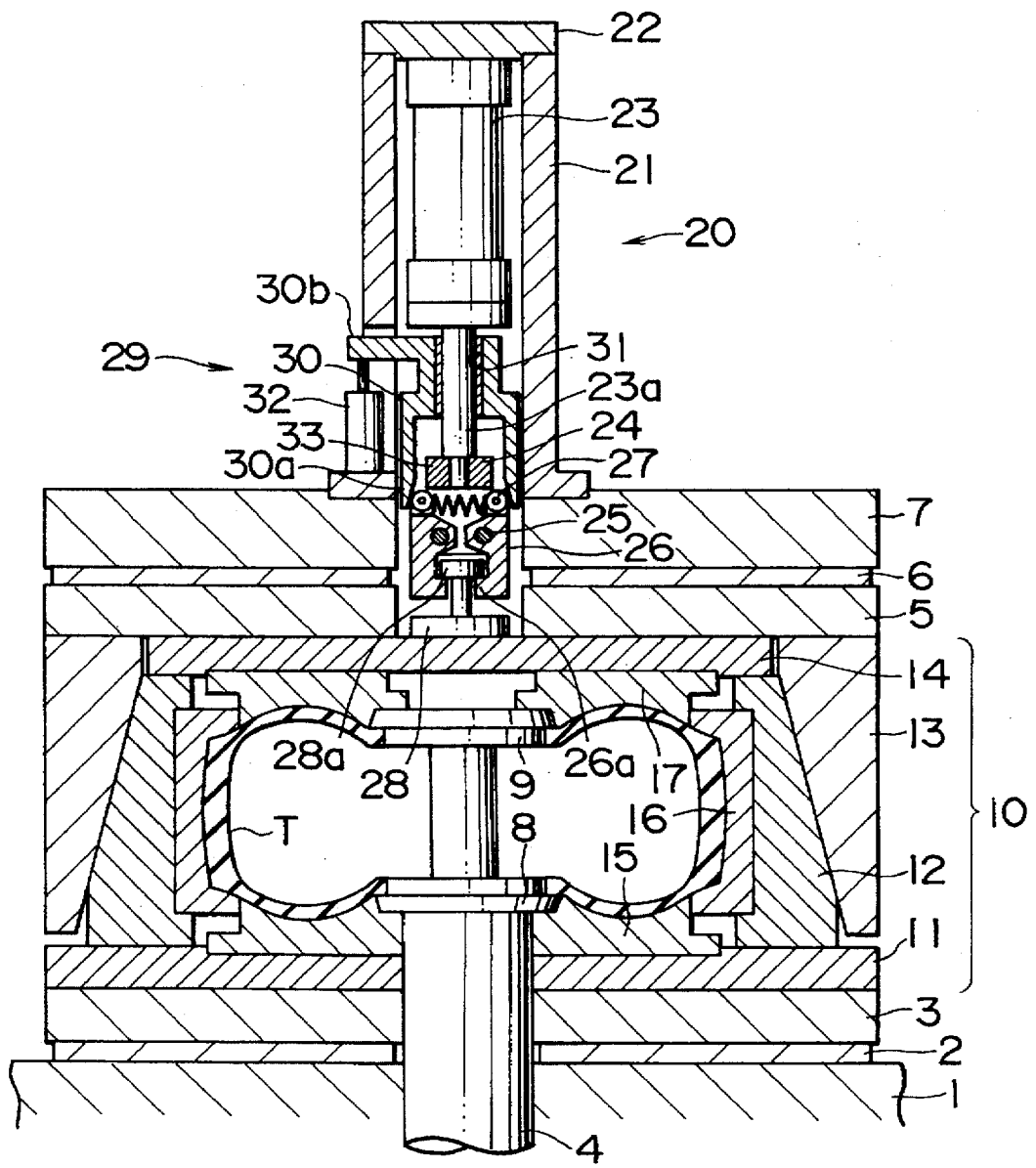
FIG. 1 is a longitudinal sectional side view showing a first embodiment of a split mold opening/closing device for a tire vulcanizer in accordance with the present invention.

DETAILED DESCRIPTION OF PREFERRED EMBODIMENTS (First Embodiment)

A first embodiment of the split mold opening/closing device for a tire vulcanizer in accordance with the present invention will be described with reference to FIG. 1. The same reference numerals are applied to the same parts as those in the conventional device, and the explanation is omitted.

A split mold opening/closing device 20 comprises a split mold opening/closing cylinder 23 fixed to a bolster plate 7 via a bracket 21 and a flange 22, a block 24 fixed to the tip end of a piston rod 23a of the split mold opening/closing cylinder 23, a plurality of fingers 26 assembled to the block 24 via pins 25 in such a manner as to be capable of oscillating, cam rollers 27 rotatably assembled to the upper end of the fingers 26, and a block 28 having a flange 28a formed at the upper end thereof, the flange 28a being capable of engaging with holding claws 26a formed at the lower end parts of the fingers 26 when the lower end of the block 24 abuts. The block 28 is bolted to a top plate 14 of a split mold 10 in advance. To oscillate the fingers 26, a finger driving device 29 is provided on the split mold opening/closing device 20.

The finger driving device 29 comprises a compression spring 33 for applying a force to hold the flange 28a by bringing the holding claws 26a of the fingers 26 close to each other, a cam body 30 in which a bushing 31 sliding with the piston rod 23a being a guide member is inserted on the inner peripheral surface and a conical face 30a engaging with the cam rollers 27 is formed on the inner peripheral surface at the lower end, and a cam body elevating cylinder 32 incorporated between an arm 30b extending from the cam body 30 and the aforementioned bracket 21.

Next, the operation of the first embodiment shown in FIG. 1 will be described in detail.

FIG. 1 shows a state in which the flange 28a is held by the claws 26a of the fingers 26, so that the top plate 14 is connected to the piston rod 23a, thereby closing the split mold 10.

In this state, when the piston rod 23a of the split mold opening/closing cylinder 23 is operated in the extending direction to raise the bolster plate 7, the split mold 10 is opened in the same manner as the conventional device. In the case where the split mold 10 is open, when the piston rod 23a of the split mold opening/closing cylinder 23 is operated in the retracting direction, a tread mold portion 16 and the like are housed in an outer ring 13.

When the mold is replaced, the cam body elevating cylinder 32 is operated in the state shown in FIG. 1 to lower the cam body 30, by which the conical face 30a is engaged with the cam rollers 27. When the cam body 30 is further lowered, the compression spring 33 is compressed, by which the fingers 26 are oscillated. Consequently, the claws 26a are separated, so that the flange 28a is released from the claws 26a. Next, bolts (not shown) fixing the outer ring 13 to an upper hot plate 5 are removed, and then the bolster plate 7 is raised. Thereupon, the upper hot plate 5 is separated from the split mold 10 with the block 28 being fixed to the top plate 14, so that the split mold 10 can be replaced. The returning to the original state after the replacement of the split mold 10 is carried out by reversing above procedure.

Since the replacement of the split mold 10 is performed with the split mold 10 being closed, the cam body elevating cylinder 32 can have a small stroke necessary for the oscillation of the fingers 26 in comparison with the split mold opening/closing cylinder 23.

(Second Embodiment)

Next, a second embodiment of the split mold opening/closing device for a tire vulcanizer in accordance with the present invention will be described with reference to FIG. 2.

A split mold opening/closing device 40 comprises a split mold opening/closing cylinder 43 fixed to a bolster plate 7 via a bracket 41 and a flange 42, a flange 43b formed at the tip end of a piston rod 43a of the cylinder 43, a block 47 fixed to a top plate 14, a plurality of fingers 44 which are assembled to the block 47 via pins 45 in such a manner as to be capable of oscillating and formed with holding claws 44a capable of holding the flange 43b when the flange 43b abuts on the top surface of the block 47, and cam rollers 46 rotatably assembled to the upper end of the finger 44. To oscillate the finger 44, a finger driving device 48 is provided on the split mold opening/closing device 40.

The finger driving device 48 comprises a compression spring 49 inserted between levers 44b extending downward from the fingers 44, a cam body 50 in which a bushing 51 sliding with the piston rod 43a being a guide member is inserted on the inner peripheral surface and a conical face 50a engaging with the cam rollers 46 is formed on the outer peripheral surface at the lower end, and a cam body elevating cylinder 53 assembled between an arm 50b extending from the cam body 50 and the bracket 41.

Next, the operation of the second embodiment shown in FIG. 2 will be described in detail.

Figure 2:
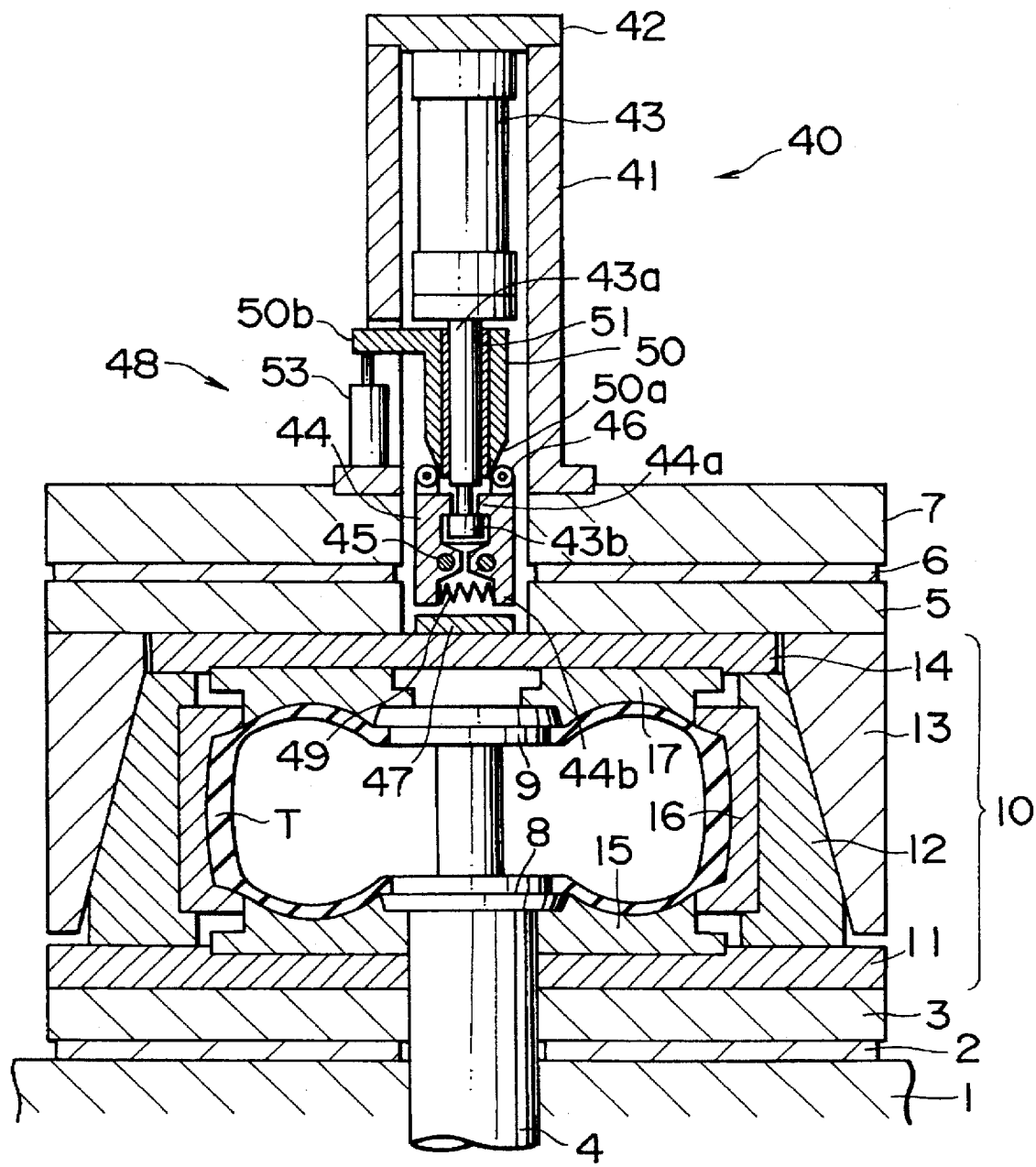
FIG. 2 is a longitudinal sectional side view showing a second embodiment of the split mold opening/closing device.

FIG. 2 shows a stake in which the flange 43b is held by the claws 44a of the fingers 44, so that the top plate 14 is connected to the piston rod 43a, thereby closing the split mold 10.

In this state, when the piston rod 43a of the split mold opening/closing cylinder 43 is operated in the extending direction to raise the bolster plate 7, the split mold 10 is opened in the same manner as the conventional device. In the case where the split mold 10 is open, when the piston rod 43a of the split mold opening/closing cylinder 43 is operated in the retracting direction, a tread mold portion 16 and the like are pulled up and housed in an outer ring 13.

In the state shown in FIG. 2, when the cam body elevating cylinder 53 is operated to lower the cam body 50, the conical face 50a is engaged with the cam rollers 46. When the cam body 50 is further lowered, the compression spring 49 is compressed, by which the fingers 44 are oscillated. Consequently, the claws 44a are separated, so that the flange 43b is released from the claws 44a.

Next, bolts fixing the outer ring 13 to an upper hot plate 5 are removed, and then the bolster plate 7 is raised. Thereupon, the upper hot plate 5 is separated from the split mold 10 with the block 47, to which the fingers 44 are assembled, being fixed to the top plate 14, so that the split mold 10 can be replaced. The returning to the original state after the replacement of the split mold 10 is carried out by reversing above procedure.

In this embodiment, like the first embodiment, the stroke of the cam body elevating cylinder 53 can be relatively small.

(Third Embodiment)

Next, a third embodiment of the split mold opening/closing device for a tire vulcanizer in accordance with the present invention will be described with reference to FIG. 3.

A split mold opening/closing device 60 comprises a split mold opening/closing cylinder 63 fixed to a bolster plate 7 via a bracket 61 and a flange 62, a flange 63b formed at the tip end of a piston rod 63a of the cylinder 63, a block 66 fixed to a top plate 14 via a bracket 67, a plurality of fingers 64 which are assembled to the block 66 via pins 65 in such a manner as to be capable of oscillating and formed with holding claws 64a capable of holding the flange 63b when the flange 63b abuts on the top surface of the block 66, and cam rollers 68 rotatably assembled to the upper end of the fingers 64. To oscillate the fingers 64, a finger driving device 69 is provided on the split mold opening/closing device 60.

The finger driving device 69 comprises a tension spring 70 inserted between levers 64b extending downward from the finger 64, a cam body 71 in which a bushing 72 sliding with the piston rod 63a being a guide member is inserted on the inner peripheral surface and a conical face 71a engaging with the cam rollers 68 is formed on the inner peripheral surface at the lower end, and a cam body elevating cylinder 73 assembled between an arm 71b extending from the cam body 71 and the flange 62.

Next, the operation of the third embodiment shown in FIG. 3 will be described in detail.

Figure 3:
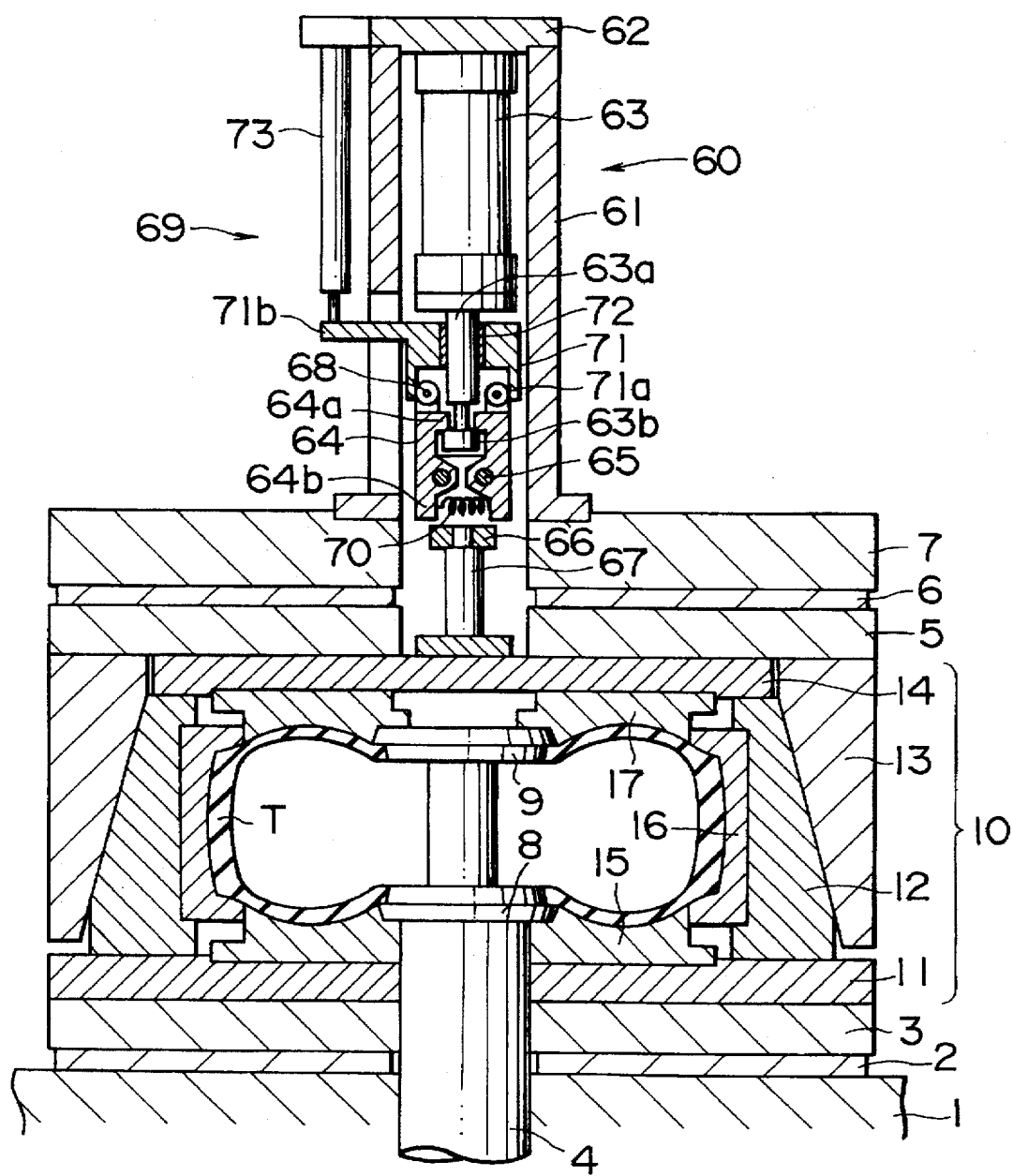
FIG. 3 is a longitudinal sectional side view showing a third embodiment of the split mold opening/closing device.
Figure 4:
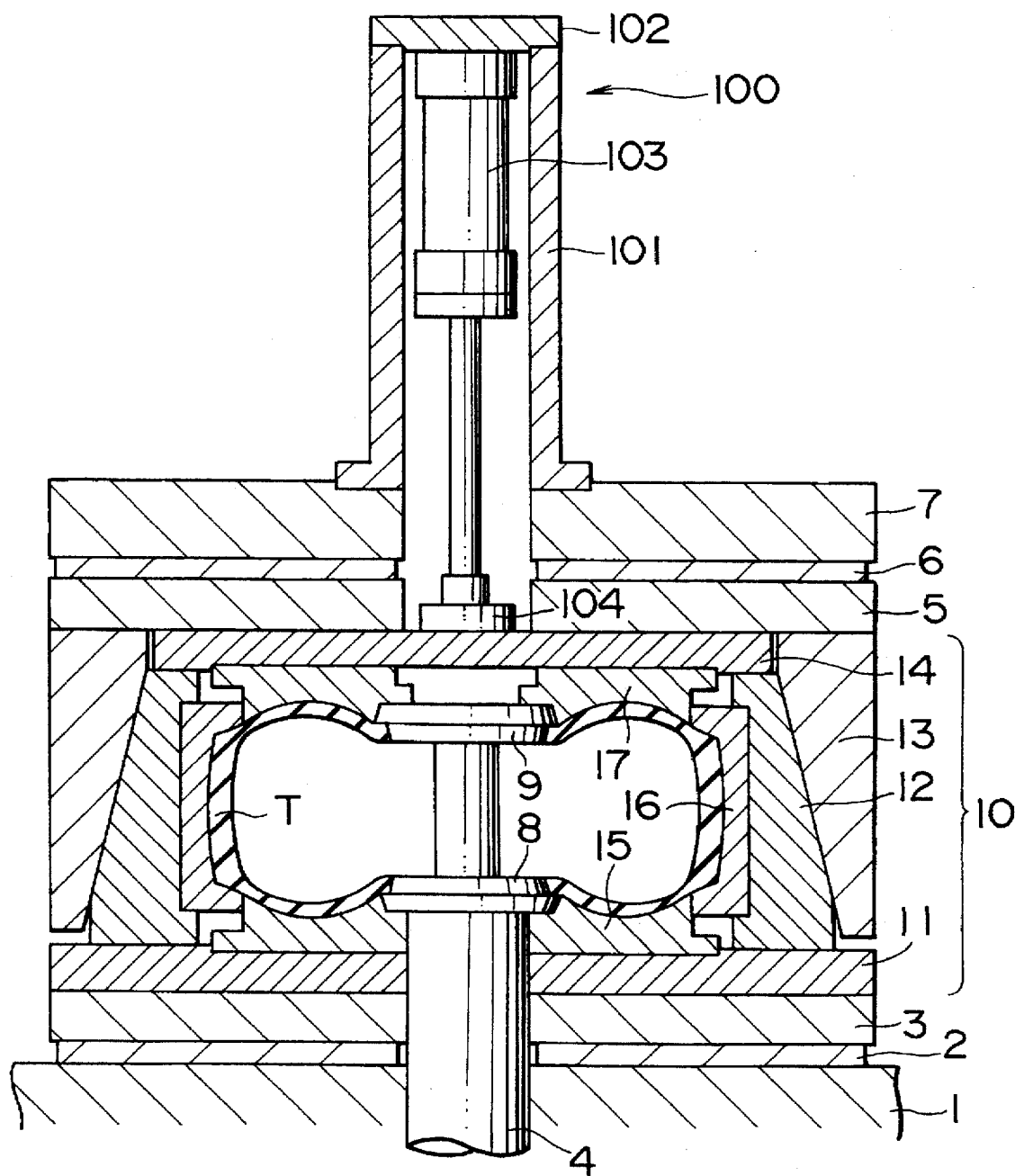
FIG. 4 is a longitudinal sectional side view showing an example of a conventional split mold opening/closing device.
Figure 5:
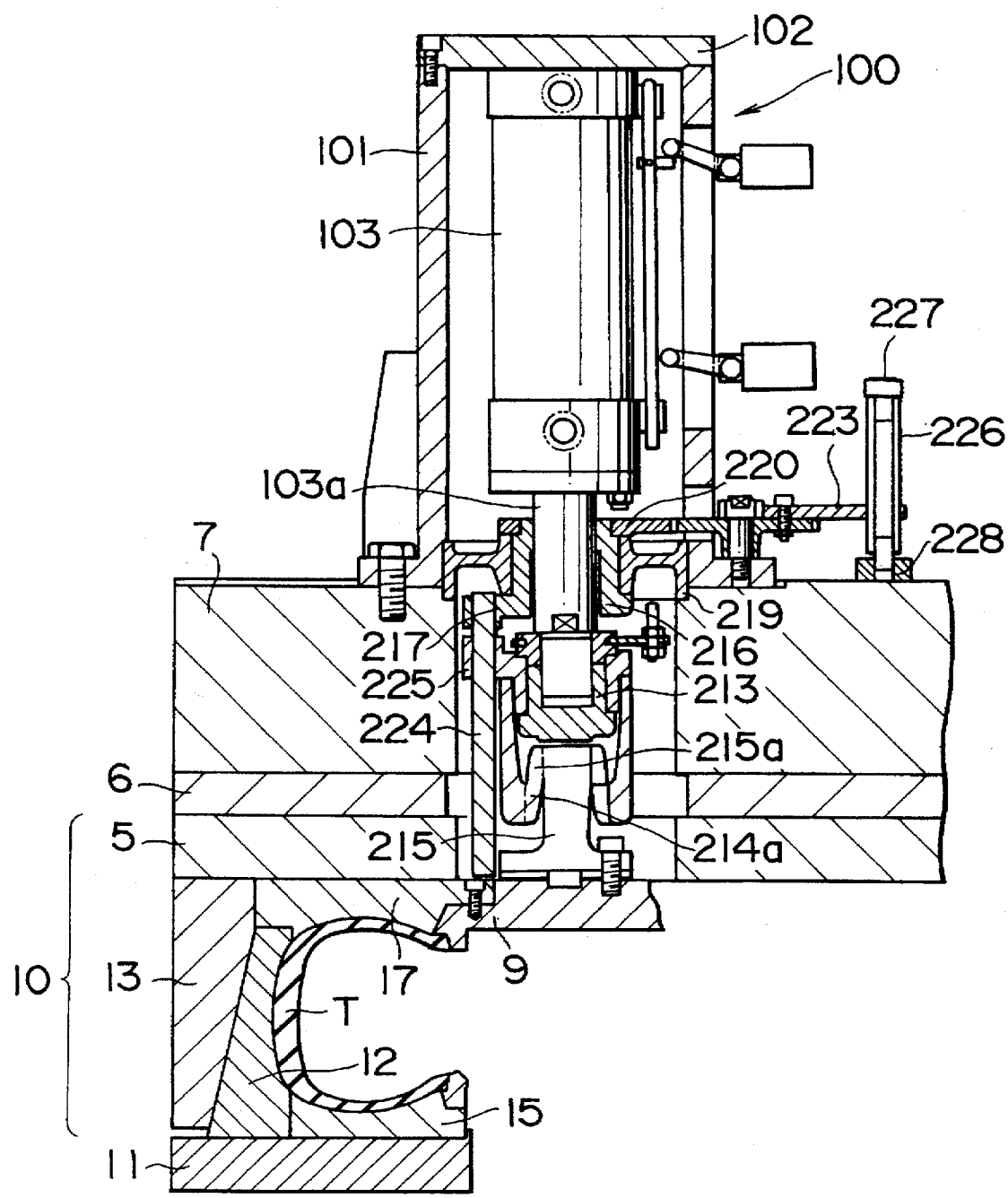
FIG. 5 is a longitudinal sectional side view showing another example of a conventional split mold opening/closing device.

FIG. 3 shows a state in which the flange 63b is held by the claws 64a of the fingers 64, so that the top plate 14 is connected to the piston rod 63a, thereby closing the split mold 10.

In this state, when the piston rods of the split mold opening/closing cylinder 63 and the cam body elevating cylinder 73 are operated in the extending direction to raise the bolster plate 7, the split mold 10 is opened in the same manner as the conventional device. In the case where the split mold 10 is open, when the piston rod 63a of the split mold opening/closing cylinder 63 is operated in the retracting direction, a tread mold portion 16 and the like are pulled up and housed in an outer ring 13.

In the state shown in FIG. 3, when the cam body elevating cylinder 73 is operated to raise the cam body 71, the cam rollers 68 are separated by the tension force of the tension spring 70, by which the claws 64a are separated, so that the flange 63b is released from the claws 64a. Next, bolts fixing the outer ring 13 to an upper hot plate 5 are removed, and then the bolster plate 7 is raised. Thereupon, the upper hot plate 5 is separated from the split mold 10 with the block 66, to which the fingers 64 are assembled, being fixed to the top plate 14, so that the split mold 10 can be replaced. The returning to the original state after the replacement of the split mold 10 is carried out by reversing above procedure.

In this embodiment, unlike the first and second embodiments, the stroke of the cam body elevating cylinder 73 must be substantially equal to that of the split mold opening/closing cylinder 63.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A split mold opening/closing device for a tire vulcanizer, which is used by being incorporated in a tire vulcanizer, comprising: a flange fixed to either one of a top plate of a split mold and a piston rod tip end of a split mold opening/closing cylinder, a plurality of fingers assembled to the other of the top plate of the split mold and the piston rod tip end of the split mold opening/closing cylinder in such a manner as to be capable of oscillating, and a finger driving device for holding and releasing said flange by oscillating said fingers.

2. The split mold opening/closing device for a tire vulcanizer according to claim 1, wherein said finger driving device comprises a compression spring for applying a force to hold said flange by bringing holding claws of said fingers close to each other, a cam body having a bushing sliding with said piston rod, said bushing being a guide member and is inserted on an inner peripheral surface of said cam body, a conical face engaging with cam rollers is formed on the inner peripheral surface on a finger side at a lower end of said cam body, and a cam body elevating cylinder incorporated between an arm extending from said cam body and a bracket fixing said split mold opening/closing cylinder to a bolster plate.

3. The split mold opening/closing device for a tire vulcanizer according to claim 1, wherein said finger driving device comprises a compression spring inserted between levers extending downward from said fingers, a cam body having a bushing sliding with said piston rod, said bushing being a guide member and is inserted on an inner peripheral surface of said cam body, a conical face engaging with cam rollers is formed on the outer peripheral surface on a finger side at a lower end of said cam body, and a cam body elevating cylinder assembled between an arm extending from said cam body and a bracket fixing said split mold opening/closing cylinder to a bolster plate.

4. The split mold opening/closing device for a tire vulcanizer according to claim 1, wherein said finger driving device comprises a tension spring inserted between levers extending downward from said fingers, a cam body having a bushing sliding with said piston rod, said bushing being a guide member and is inserted on an inner peripheral surface of said cam body, a conical face engaging with cam rollers is formed on the inner peripheral surface on a finger side at a lower end of said cam body, and a cam body elevating cylinder assembled between an arm extending from said cam body and a bracket fixing said split mold opening/closing cylinder to a bolster plate.

* * * * *